(12) United States Patent
Abdallah et al.

(10) Patent No.: US 9,891,915 B2
(45) Date of Patent: Feb. 13, 2018

(54) METHOD AND APPARATUS TO INCREASE THE SPEED OF THE LOAD ACCESS AND DATA RETURN SPEED PATH USING EARLY LOWER ADDRESS BITS

(71) Applicant: Intel Corporation, Santa Clara, CA (US)

(72) Inventors: Mohammad A. Abdallah, El Dorado Hills, CA (US); Ravishankar Rao, Redwood City, CA (US)

(73) Assignee: INTEL CORPORATION, Santa Clara, CA (US)

( * ) Notice: Subject to any disclaimer, the term of this patent is extended or adjusted under 35 U.S.C. 154(b) by 220 days.

(21) Appl. No.: 14/281,663

(22) Filed: May 19, 2014

(65) Prior Publication Data
US 2014/0304492 A1  Oct. 9, 2014

Related U.S. Application Data

(63) Continuation of application No. 14/211,878, filed on Mar. 14, 2014.
(Continued)

(51) Int. Cl.
*G06F 12/00* (2006.01)
*G06F 9/30* (2006.01)
*G06F 12/1045* (2016.01)

(52) U.S. Cl.
CPC ...... *G06F 9/30043* (2013.01); *G06F 12/1054* (2013.01)

(58) Field of Classification Search
CPC .......................... G06F 12/1054; G06F 9/30043
See application file for complete search history.

(56) References Cited

U.S. PATENT DOCUMENTS 5,053,952 A   10/1991  Koopman, Jr. et al.
5,386,583 A    1/1995  Hendricks
(Continued)

FOREIGN PATENT DOCUMENTS

CN    1841314 A    10/2006
EP    0638183 A1    2/1995
(Continued)

OTHER PUBLICATIONS

Zhou Li, Fast interconnect synthesis with layer assignment, Apr. 2008.*
(Continued)

*Primary Examiner* — Reginald Bragdon
*Assistant Examiner* — Hannah A Faye-Joyner
(74) *Attorney, Agent, or Firm* — Nicholson De Vos Webster & Elliott LLP

(57) ABSTRACT

A microprocessor implemented method for resolving dependencies for a load instruction in a load store queue (LSQ) is disclosed. The method comprises initiating a computation of a virtual address corresponding to the load instruction in a first clock cycle. It also comprises transmitting early calculated lower address bits of the virtual address to a load store queue (LSQ) in the same cycle as the initiating. Finally, it comprises performing a partial match in the LSQ responsive to and using the lower address bits to find a prior aliasing store, wherein the prior aliasing store stores to a same address as the load instruction.

18 Claims, 7 Drawing Sheets

Related U.S. Application Data

(60) Provisional application No. 61/799,116, filed on Mar. 15, 2013.

(56) References Cited

U.S. PATENT DOCUMENTS

| | | | |
|---|---|---|---|
| 5,651,124 | A | 7/1997 | Shen et al. |
| 5,729,766 | A | 3/1998 | Cohen |
| 5,751,982 | A | 5/1998 | Morley |
| 5,784,638 | A | 7/1998 | Goetz et al. |
| 5,826,055 | A | 10/1998 | Wang et al. |
| 5,826,073 | A | 10/1998 | Ben-Meir et al. |
| 5,870,575 | A | 2/1999 | Kahle et al. |
| 5,870,584 | A | 2/1999 | Bennett |
| 5,905,876 | A | 5/1999 | Pawlowski et al. |
| 5,983,335 | A | 11/1999 | Dwyer, III |
| 6,049,868 | A | 4/2000 | Panwar |
| 6,052,777 | A | 4/2000 | Panwar |
| 6,061,785 | A | 5/2000 | Chiarot et al. |
| 6,167,508 | A | 12/2000 | Farrell et al. |
| 6,269,439 | B1 | 7/2001 | Hanaki |
| 6,360,311 | B1 | 3/2002 | Zandveld et al. |
| 6,385,676 | B1 | 5/2002 | Adkisson |
| 6,557,095 | B1 | 4/2003 | Henstrom |
| 6,711,672 | B1 | 3/2004 | Agesen |
| 6,779,092 | B2 | 8/2004 | Watts |
| 6,813,704 | B1 | 11/2004 | Nguyen |
| 6,898,699 | B2 | 5/2005 | Jourdan et al. |
| 7,096,345 | B1 | 8/2006 | Chen et al. |
| 7,113,510 | B2 | 9/2006 | Lin |
| 7,127,592 | B2 | 10/2006 | Abraham et al. |
| 7,170,814 | B2 | 1/2007 | Morikawa |
| 7,315,935 | B1 | 1/2008 | Alsup et al. |
| 7,373,637 | B2 | 5/2008 | Dewitt et al. |
| 7,434,031 | B1 * | 10/2008 | Spracklen ............ G06F 9/3826 712/217 |
| 7,644,210 | B1 | 1/2010 | Banning et al. |
| 7,710,763 | B2 | 5/2010 | Houston |
| 7,716,460 | B2 | 5/2010 | Stempel et al. |
| 7,721,076 | B2 | 5/2010 | Sodani et al. |
| 7,783,869 | B2 | 8/2010 | Grandou et al. |
| 7,813,163 | B2 | 10/2010 | Pille et al. |
| 8,024,522 | B1 | 9/2011 | Favor et al. |
| 8,074,060 | B2 | 12/2011 | Col et al. |
| 8,219,784 | B2 | 7/2012 | Ban et al. |
| 8,238,192 | B2 | 8/2012 | Nii |
| 8,959,094 | B2 | 2/2015 | Taylor |
| 2002/0032852 | A1 | 3/2002 | Ramirez et al. |
| 2003/0101444 | A1 | 5/2003 | Wu et al. |
| 2003/0163671 | A1 | 8/2003 | Gschwind et al. |
| 2004/0133766 | A1 | 7/2004 | Abraham et al. |
| 2006/0026408 | A1 | 2/2006 | Morris et al. |
| 2006/0242365 | A1 | 10/2006 | Ali et al. |
| 2007/0186081 | A1 | 8/2007 | Chaudhry et al. |
| 2007/0192541 | A1 * | 8/2007 | Balasubramonian G06F 12/0893 711/118 |
| 2008/0028195 | A1 | 1/2008 | Kissell et al. |
| 2008/0126771 | A1 | 5/2008 | Chen et al. |
| 2008/0216073 | A1 | 9/2008 | Yates et al. |
| 2009/0019261 | A1 | 1/2009 | Nguyen et al. |
| 2009/0049279 | A1 | 2/2009 | Steiss et al. |
| 2009/0103377 | A1 | 4/2009 | Chang |
| 2009/0164766 | A1 | 6/2009 | Suggs et al. |
| 2009/0182987 | A1 | 7/2009 | Mejdrich et al. |
| 2009/0210627 | A1 | 8/2009 | Alexander et al. |
| 2009/0254709 | A1 | 10/2009 | Agesen |
| 2010/0064287 | A1 | 3/2010 | Bull et al. |
| 2010/0097840 | A1 | 4/2010 | Kim |
| 2010/0131742 | A1 | 5/2010 | Col et al. |
| 2010/0153690 | A1 | 6/2010 | Vick et al. |
| 2010/0161948 | A1 | 6/2010 | Abdallah |
| 2010/0299671 | A1 | 11/2010 | Kinsey |
| 2011/0016292 | A1 | 1/2011 | McDonald et al. |
| 2011/0271055 | A1 * | 11/2011 | O'Connor ............ G06F 12/0802 711/118 |
| 2011/0320784 | A1 | 12/2011 | Almog et al. |
| 2012/0117335 | A1 | 5/2012 | Bryant |
| 2012/0198157 | A1 | 8/2012 | Abdallah |
| 2012/0221747 | A1 | 8/2012 | Mei et al. |
| 2012/0246450 | A1 | 9/2012 | Abdallah |
| 2013/0086365 | A1 | 4/2013 | Gschwind et al. |
| 2014/0126278 | A1 | 5/2014 | Nii et al. |
| 2014/0281388 | A1 | 9/2014 | Abdallah |
| 2014/0281422 | A1 | 9/2014 | Abdallah et al. |
| 2014/0282546 | A1 | 9/2014 | Abdallah et al. |
| 2014/0282575 | A1 | 9/2014 | Chan et al. |
| 2015/0023086 | A1 | 1/2015 | Wendell |
| 2015/0324213 | A1 | 11/2015 | Abdallah et al. |

FOREIGN PATENT DOCUMENTS

| | | |
|---|---|---|
| TW | 200719216 | 5/2007 |
| TW | I329437 B | 8/2010 |
| TW | I368165 B | 7/2012 |
| TW | I377502 B | 11/2012 |
| WO | 9737301 A1 | 10/1997 |

OTHER PUBLICATIONS

Micheal Slater, Microprocessor Report, the insiders' guide to Microprocessor Hardware, Oct. 1994, vol. 8.*
Final Office Action from U.S. Appl. No. 14/211,878, dated Oct. 20, 2016, 23 pages.
Non-Final Office Action from U.S. Appl. No. 14/211,878, dated Jan. 10, 2017, 12 pages.
Non-Final Office Action from U.S. Appl. No. 14/211,878, dated Jun. 9, 2016, 13 pages.
Final Office Action from U.S. Appl. No. 14/211,878, dated Sep. 8, 2017, 18 pages.

* cited by examiner

METHOD AND APPARATUS TO INCREASE THE SPEED OF THE LOAD ACCESS AND DATA RETURN SPEED PATH USING EARLY LOWER ADDRESS BITS

CROSS-REFERENCE TO RELATED APPLICATIONS

This application is a continuation of application Ser. No. 14/211,878, filed Mar. 14, 2014, which claims the benefit of U.S. Provisional Application No. 61/799,116, filed Mar. 15, 2013, which are hereby incorporated by reference.

FIELD OF THE INVENTION

Embodiments according to the present invention generally relate to microprocessor architecture and more particularly to the architecture for out-of-order microprocessors.

BACKGROUND OF THE INVENTION

One of the most critical paths in high-performance processors is the load-to-use path, which is defined as the time between computing the address of a load to writing the data back to registers. An increase in the number of cycles in the load-to-use path directly affects the performance (measured in "instructions per cycle") of the processor.

The critical components of the load-to-use path in a conventional Out-Of-Order ("OOO") processor for any given load instruction typically comprise the following:
1. Computing the address of the load.
2. Looking up a fully-associative translation lookaside buffer ("TLB") and a set associative Level-1 Data Cache ("L1 D-cache").
3. Carrying out load address disambiguation with the address of older stores in the Load Store Queue ("LSQ"), which may result in forwarding data from the youngest store older than the load.
4. Merging data from the L1 D-cache and LSQ if the load hits partially in the LSQ.
5. Writing back the loaded data to a register file or bypassing it in order to execute an instruction on the fly.

As a result of the above-listed various stages, the load-to-use path is highly time intensive in conventional processors and can result in undesirable latencies.

BRIEF SUMMARY OF THE INVENTION

Accordingly, a need exists for a method and apparatus for a more efficient and flexible OOO processor architecture that is configured to reduce the latencies in the multi-cycle "load-to-use" path. Embodiments of the present invention allow a realignment of the timing critical load-to-use path, which results in a faster and more efficient path with no loss of performance. Embodiments of the present invention also advantageously allow for higher frequencies since the load-to-use critical path is often the limiting part of the microprocessor architecture.

Embodiments of the present invention accelerate the load-to-use path, in part, by advantageously borrowing time from the cycle in which the address for the memory operation is generated to perform certain memory related operations earlier in time, which in turn allows an earlier access time to the memory structures in the processor pipeline. In one embodiment, early calculated lower order bits of a virtual address of a load instruction are used to start indexing into a set associative translation lookaside buffer (TLB) and into a L1-data cache in parallel to the full address being generated. By using the earlier generated lower address bits efficiently in the same cycle as the address generation, the access time to the memory structures in the processor pipeline is reduced and the latencies in the load-to-use path are advantageously reduced.

Embodiments of the present invention also use the early calculated lower order bits of the virtual address to start indexing into a Load Store Queue (LSQ) in the same cycle as the full virtual address is being generated. Instead of using the entire virtual address to perform disambiguation to determine if there is a hit or miss within the LSQ, the few early bits can be used to create a unique hash and perform a partial match in the LSQ. The partial match allows certain entries in the LSQ to be ruled out. It can also simplify any subsequent compare operation, because only the remaining entries in the LSQ need to be matched with the full virtual address when it is available.

In one embodiment, a microprocessor implemented method for resolving dependencies for a load instruction in a load store queue (LSQ) is disclosed. The method comprises initiating a computation of a virtual address corresponding to the load instruction in a first clock cycle. It also comprises transmitting early calculated lower address bits of the virtual address to a load store queue (LSQ) in the same cycle as initiating the computation of the virtual address. Finally, it comprises performing a partial match in the LSQ responsive to and using the lower address bits to find a prior aliasing store, wherein the prior aliasing store stores to a same address as the load instruction.

In another embodiment, a processor unit configured to perform a method for resolving dependencies for a load instruction in a load store queue (LSQ) is disclosed. The method comprises initiating a computation of a virtual address corresponding to the load instruction in a first clock cycle. It also comprises transmitting early calculated lower address bits of the virtual address to a load store queue (LSQ) in the same cycle as initiating the computation of the virtual address. Finally, it comprises performing a partial match in the LSQ responsive to and using the lower address bits to find a prior aliasing store, wherein the prior aliasing store stores to a same address as the load instruction.

In another embodiment, an apparatus configured to perform a method for resolving dependencies for a load instruction in a load store queue (LSQ) is disclosed. The apparatus comprises a memory and a processor communicatively coupled to the memory, wherein the processor is configured to process instructions out of order, and further wherein the processor is configured to perform a method. The method comprises initiating a computation of a virtual address corresponding to the load instruction. It also comprises transmitting early calculated lower address bits of the virtual address to a load store queue (LSQ) in a same cycle as initiating the computation of the virtual address. Finally, it comprises performing a partial match in the LSQ responsive to and using the lower address bits to find a prior aliasing store, wherein the prior aliasing store stores to a same address as the load instruction.

The following detailed description together with the accompanying drawings will provide a better understanding of the nature and advantages of the present invention.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION OF THE INVENTION

Figure 1:
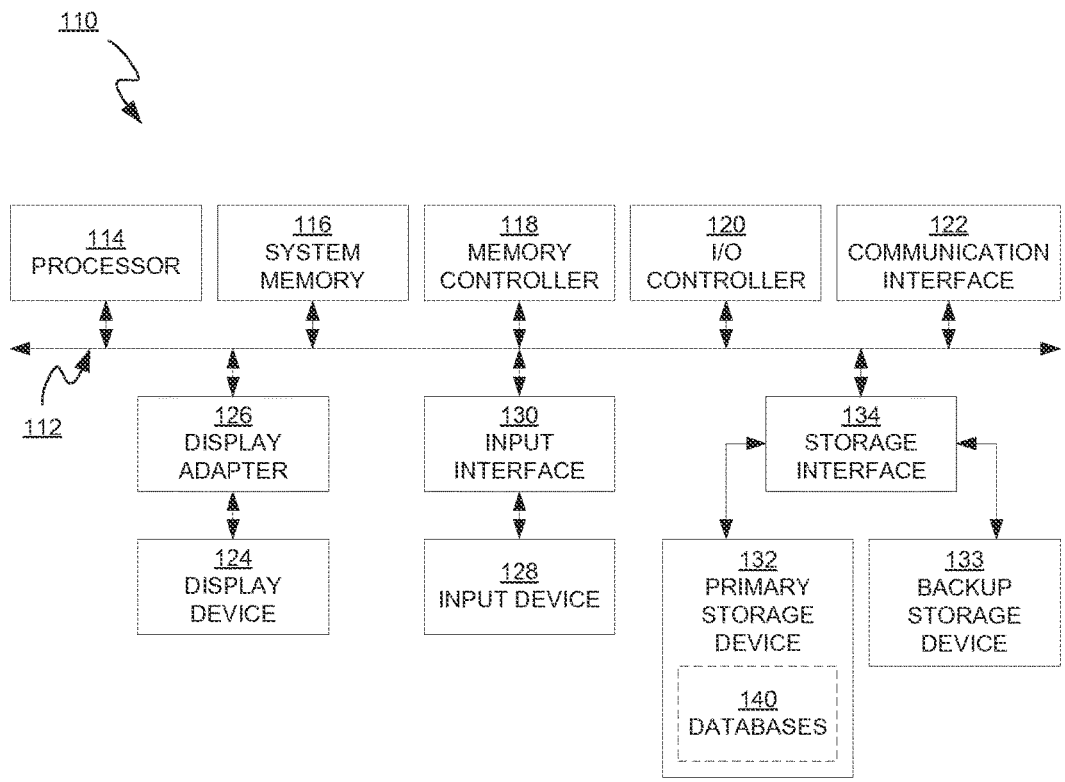
FIG. 1 is an exemplary computer system in accordance with embodiments of the present invention.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

NOTATION AND NOMENCLATURE

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "computing," "performing," "retrieving," "finding," "routing," and "comparing," or the like, refer to actions and processes (e.g., flowchart 600 of FIG. 6) of a computer system or similar electronic computing device or processor (e.g., system 110 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

FIG. 1 is a block diagram of an example of a computing system 110 capable of being integrated with a processor 114 of an embodiment of the present disclosure. Computing system 110 broadly represents any single or multi-processor computing device or system capable of executing computer-readable instructions. Examples of computing system 110 include, without limitation, workstations, laptops, client-side terminals, servers, distributed computing systems, handheld devices, or any other computing system or device. In its most basic configuration, computing system 110 may include at least one processor 114 of an embodiment of the present invention and a system memory 116.

Processor 114 incorporates embodiments of the present invention and generally represents any type or form of processing unit capable of processing data or interpreting and executing instructions. In certain embodiments, processor 114 may receive instructions from a software application or module. These instructions may cause processor 114 to perform the functions of one or more of the example embodiments described and/or illustrated herein. In one embodiment, processor 114 may be an out of order microprocessor. In a different embodiment, processor 114 may be a superscalar processor. In yet another embodiment, processor 114 may comprise multiple processors operating in parallel.

System memory 116 generally represents any type or form of volatile or non-volatile storage device or medium capable of storing data and/or other computer-readable instructions. Examples of system memory 116 include, without limitation, RAM, ROM, flash memory, or any other suitable memory device. Although not required, in certain embodiments computing system 110 may include both a volatile memory unit (such as, for example, system memory 116) and a non-volatile storage device (such as, for example, primary storage device 132).

Computing system 110 may also include one or more components or elements in addition to processor 114 and system memory 116. For example, in the embodiment of FIG. 1, computing system 110 includes a memory controller 118, an input/output (I/O) controller 120, and a communication interface 122, each of which may be interconnected via a communication infrastructure 112. Communication infrastructure 112 generally represents any type or form of infrastructure capable of facilitating communication between one or more components of a computing device. Examples of communication infrastructure 112 include, without limitation, a communication bus (such as an Industry Standard Architecture (ISA), Peripheral Component Interconnect (PCI), PCI Express (PCIe), or similar bus) and a network.

Memory controller 118 generally represents any type or form of device capable of handling memory or data or controlling communication between one or more components of computing system 110. For example, memory controller 118 may control communication between processor 114, system memory 116, and I/O controller 120 via communication infrastructure 112.

I/o controller 120 generally represents any type or form of module capable of coordinating and/or controlling the input and output functions of a computing device. For example, I/O controller 120 may control or facilitate transfer of data between one or more elements of computing system 110, such as processor 114, system memory 116, communication interface 122, display adapter 126, input interface 130, and storage interface 134.

Communication interface 122 broadly represents any type or form of communication device or adapter capable of facilitating communication between example computing system 110 and one or more additional devices. For example, communication interface 122 may facilitate communication between computing system 110 and a private or public network including additional computing systems. Examples of communication interface 122 include, without limitation, a wired network interface (such as a network interface card), a wireless network interface (such as a wireless network interface card), a modem, and any other suitable interface. In one embodiment, communication interface 122 provides a direct connection to a remote server via a direct link to a network, such as the Internet. Communication interface 122 may also indirectly provide such a connection through any other suitable connection.

Communication interface 122 may also represent a host adapter configured to facilitate communication between computing system 110 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 122 may also allow computing system 110 to engage in distributed or remote computing. For example, communication interface 122 may receive instructions from a remote device or send instructions to a remote device for execution.

As illustrated in FIG. 1, computing system 110 may also include at least one display device 124 coupled to communication infrastructure 112 via a display adapter 126. Display device 124 generally represents any type or form of device capable of visually displaying information forwarded by display adapter 126. Similarly, display adapter 126 generally represents any type or form of device configured to forward graphics, text, and other data for display on display device 124.

As illustrated in FIG. 1, computing system 110 may also include at least one input device 128 coupled to communication infrastructure 112 via an input interface 130. Input device 128 generally represents any type or form of input device capable of providing input, either computer- or human-generated, to computing system 110. Examples of input device 128 include, without limitation, a keyboard, a pointing device, a speech recognition device, or any other input device.

As illustrated in FIG. 1, computing system 110 may also include a primary storage device 132 and a backup storage device 133 coupled to communication infrastructure 112 via a storage interface 134. Storage devices 132 and 133 generally represent any type or form of storage device or medium capable of storing data and/or other computer-readable instructions. For example, storage devices 132 and 133 may be a magnetic disk drive (e.g., a so-called hard drive), a floppy disk drive, a magnetic tape drive, an optical disk drive, a flash drive, or the like. Storage interface 134 generally represents any type or form of interface or device for transferring data between storage devices 132 and 133 and other components of computing system 110.

In one example, databases 140 may be stored in primary storage device 132. Databases 140 may represent portions of a single database or computing device or it may represent multiple databases or computing devices. For example, databases 140 may represent (be stored on) a portion of computing system 110. Alternatively, databases 140 may represent (be stored on) one or more physically separate devices capable of being accessed by a computing device, such as computing system 110.

Continuing with reference to FIG. 1, storage devices 132 and 133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 132 and 133 may also include other similar structures or devices for allowing computer software, data, or other computer-readable instructions to be loaded into computing system 110. For example, storage devices 132 and 133 may be configured to read and write software, data, or other computer-readable information. Storage devices 132 and 133 may also be a part of computing system 110 or may be separate devices accessed through other interface systems.

Many other devices or subsystems may be connected to computing system 110. Conversely, all of the components and devices illustrated in FIG. 1 need not be present to practice the embodiments described herein. The devices and subsystems referenced above may also be interconnected in different ways from that shown in FIG. 1. Computing system 110 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 110. All or a portion of the computer program stored on the computer-readable medium may then be stored in system memory 116 and/or various portions of storage devices 132 and 133. When executed by processor 114, a computer program loaded into computing system 110 may cause processor 114 to perform and/or be a means for performing the functions of the example embodiments described and/or illustrated herein. Additionally or alternatively, the example embodiments described and/or illustrated herein may be implemented in firmware and/or hardware.

Method and Apparatus to Increase the Speed of the Load Access and Data Return Speed Path Using Early Lower Address Bits Embodiments of the present invention provide a method and apparatus for a more efficient and flexible OOO processor architecture that is configured to reduce the latencies in the multi-cycle load-to-use path, which is the most critical path in an OOO processor.

As will be explained in detail below, embodiments of the present invention accelerate the load-to-use path, in part, by borrowing time from the clock cycle in which the address for the memory operation is generated to perform certain memory related operations earlier in time, which in turn allows an earlier access time to the memory structures in the processor pipeline. In one embodiment, early calculated lower order bits of a virtual address of a load instruction are used to start indexing into a set associative translation lookaside buffer (TLB) and into a L1-data cache and this is done in parallel to the full address being generated. By using the earlier generated lower address bits efficiently in the same clock cycle as the address generation, the access time to the memory structures in the processor pipeline is reduced and the latencies in the load-to-use path are reduced.

Figure 2:
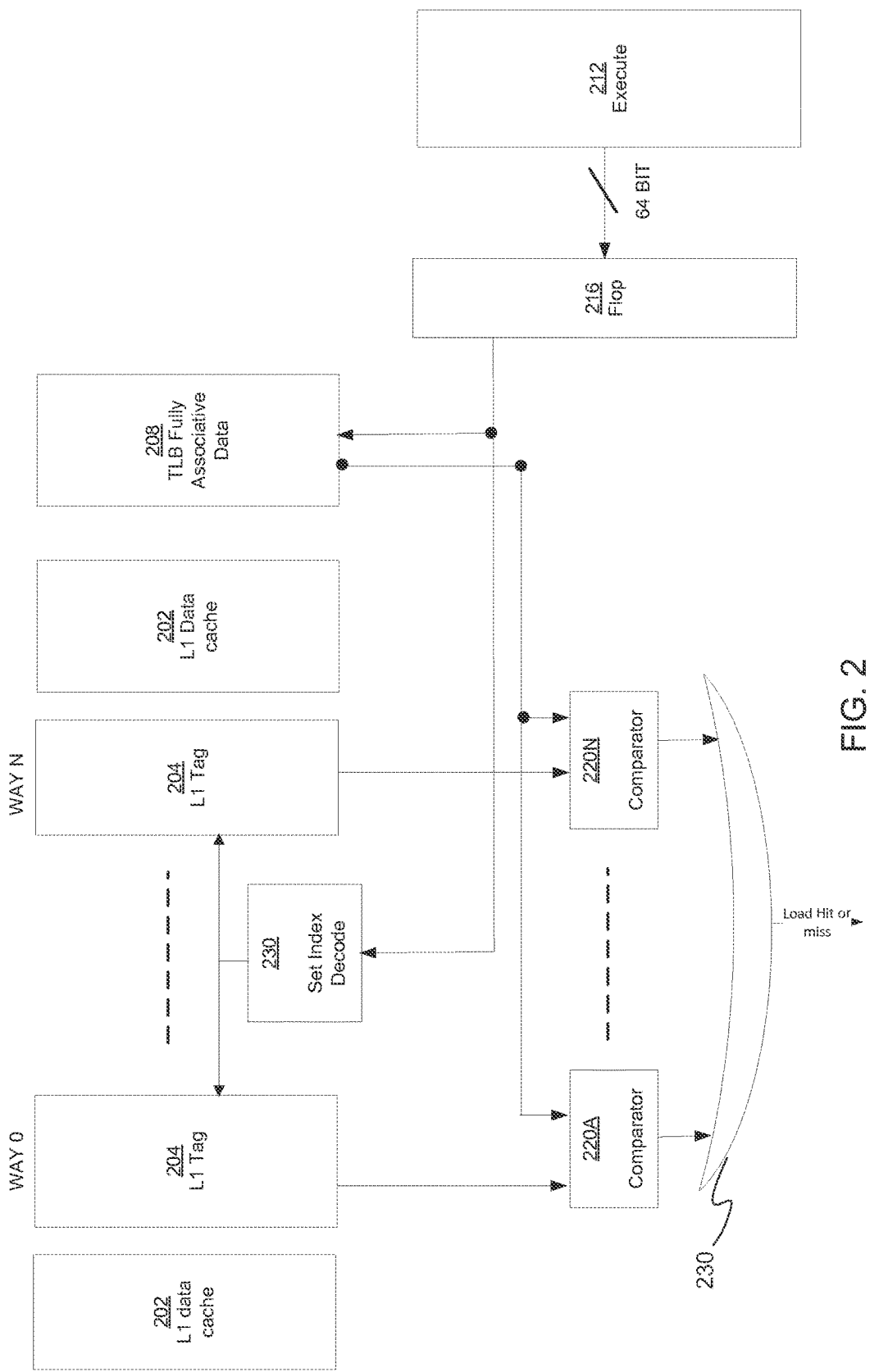
FIG. 2 is a high-level block diagram illustrating the critical components of the load-to-use path in a conventional OOO processor.

FIG. 2 is a high-level block diagram illustrating the components of the load-to-use path in a conventional OOO processor.

The components of the load-to-use path in a conventional Out-Of-Order ("OOO") processor for any given load instruction typically comprise the following:

1. Computing the address of the load—The address of the load is first computed using Execute module 212. The address generated by Execute module 212 can be a virtual address where the architecture uses a Virtually Indexed Physically Tagged (VIPT) cache structure. In a conventional design, the generated address is stored in a flip-flop 216 at the end of the cycle in which the address is generated. Traditional designs store the generated address in a flop to prepare for the next cycle of execution.

2. Looking up a fully-associative translation lookaside buffer ("TLB") and a set associative Level-1 Data Cache ("L1 D-cache")—In a conventional VIPT architecture, the TLB 208 and the L1 D-cache 202 are typically accessed in the same cycle. In the cycle following the one in which the address is generated, the address is then translated to a physical address using the fully associative TLB 208. The virtual address needs to be looked up in the TLB 208 to retrieve the physical address. The virtual address is also typically used to access the different ways (way 0 through way N) of the L1 Tag memory 204 (also known as Tag RAM or TRAM) through decode module 230 to retrieve the corresponding tag memory set for each way associated with the virtual bits. Typically, that tag look-up operation is done in parallel with the TLB look-up. As is well-known to one of ordinary skill in the art, the TRAM maintains copies of the tags that correspond to data entries of L1 data cache 202.

It is also well-known to one of ordinary skill that the simultaneous look-up of TLB 208 and L1 Tag Memory 204, discussed above, is made possible because of the commonality of lower address bits between the virtual address and the physical address. A property of organizing memory using paging is that the lower address bits are common between the physical address and the virtual address because they are used to index into the page. For example, for a page size of 1-Kilobyte, 10 address bits would be used to index within the page and these bits would match between the physical address and virtual address.

As explained above, this property is used to start the index into the data cache 202, which is physically addressed, early with the unmodified bits from the virtual address in parallel to translating the address through the TLB 208. When the complete physical address is available through the TLB 208, comparators 220A through 220N can then be used in conjunction with the physical address retrieved from TLB 208 to determine if a match exists. In other words, when the complete physical address is available through the TLB 208, it is compared to the tag bits of each way, way 0 to way N, from the Tag Memory 204 in order to find a match for the physical address. The correct data from the matched way is then multiplexed out by selecting it from among the ways of the set selected with the virtual bits. If there is a tag match in any of the ways of the set retrieved from the Tag memory 204, a Load Hit results at the output of OR gate 230. The result of the lookup, a Load Hit or Load Miss, is returned to the instruction scheduling unit.

3. Carrying out load address disambiguation with the address of older stores in the Load Store Queue ("LSQ"), which may result in forwarding data from the youngest store older than the load—This is another long path in the load-to-use path, wherein all the dependencies that exist between the load instruction and stores older than the load in program order need to be disambiguated. This requires address matches across the Load Store Queue ("LSQ") to determine if data can be gathered in a satisfactory manner to supply the dependent instructions.

4. Merging data from the L1 D-cache and LSQ if the load hits partially in the LSQ.

5. Writing back the loaded data to a register file—and bypassing it in order to execute an instruction on the fly.

As a result of the above-listed various sequential stages, the load-to-use path is highly time intensive in conventional processors and can result in undesirable latencies. Further, in conventional processors, the TLB can be implemented as a content-addressable memory (CAM) or a fully-associative TLB. The CAM search key is the virtual address and the search result is a physical address. If the requested address is present in the TLB, the CAM search yields a match and the retrieved physical address can be used to access memory. However, because TLBs are traditionally implemented as fully-associative, the time penalty associated with performing a look-up is high.

Accordingly, embodiments of the present invention allow a realignment of the above described timing critical path, which results in a faster and more efficient path with no loss of performance. Embodiments of the present invention also advantageously allow for higher frequencies since the load-to-use critical path is often the limiting part of the microprocessor architecture.

Figure 3:
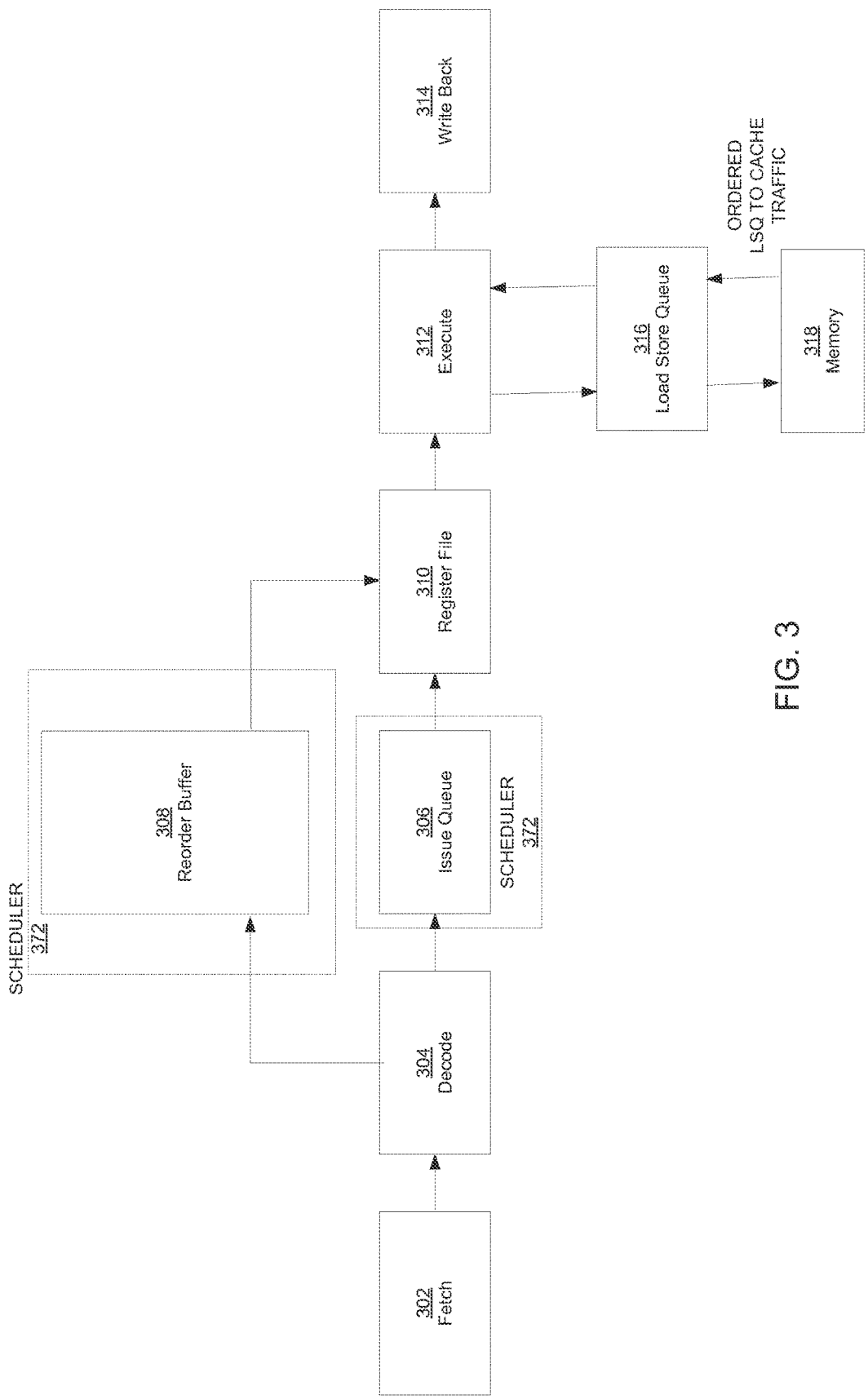
FIG. 3 is an exemplary diagram of a pipeline for an out of order microprocessor on which embodiments of the present invention can be implemented in accordance with one embodiment of the present invention.

FIG. 3 is an exemplary diagram of a pipeline for an out of order microprocessor on which embodiments of the present invention can be implemented in accordance with one embodiment of the present invention.

As illustrated in FIG. 3, instructions are fetched at the fetch stage 302 and place in the instruction fetch queue (IFQ) (not shown) within the fetch stage 302. These instructions reference the architectural registers, which are stored in register file 310. After the instructions are dispatched from the fetch unit 302, they are decoded by decode module 304 and are placed in the ROB 308 and issue queue 306 (IQ). In one embodiment of the present invention, the scheduler module 372 comprises the ROB 308 and IQ 306. As instructions are issued out of IQ 306 out of order using scheduler module 372, they are executed by execute module 312.

The write back module 314, in one embodiment, can write the resulting values from those instructions back to the temporary registers in ROB 308 first and rely on the ROB 308 to facilitate committing the instructions in order. The ROB 308 keeps track of the program order in which instructions entered the pipeline and for each of these instructions, the ROB maintains temporary register storage in a physical register file. When the oldest instructions in the ROB produce a valid result, those instructions can be safely committed. That is, the results of those instructions can be made permanent since there is no earlier instruction that can raise a mispredict or exception that may undo the effect of those instructions. When instructions are ready to be committed, the ROB 308 will move the corresponding values in the temporary registers for those instructions to the architectural register file 310. Therefore, through the ROB's in-order commit process, the results in the register file 310 are made permanent and architecturally visible.

However, in a different embodiment, write back module 314 writes the values resulting from instruction execution directly into register file 310 without sorting them. The unordered elements are added in physical memory to the register file 310 in an unordered fashion and are then retired to the architectural files in order at the retirement stage using a ROB initiated protocol.

The instructions issued out of order from the IQ 306 may also comprise loads and stores. When loads and stores are issued out of order from the IQ 306, there are memory dependencies between them that need to be resolved before those instructions can be committed. Accordingly, the load and stores instructions are stored in a Load Store Queue (LSQ) 316 while the dependencies between them are resolved with the help of ROB 308 before their resulting values can be committed to memory 318.

Figure 4:
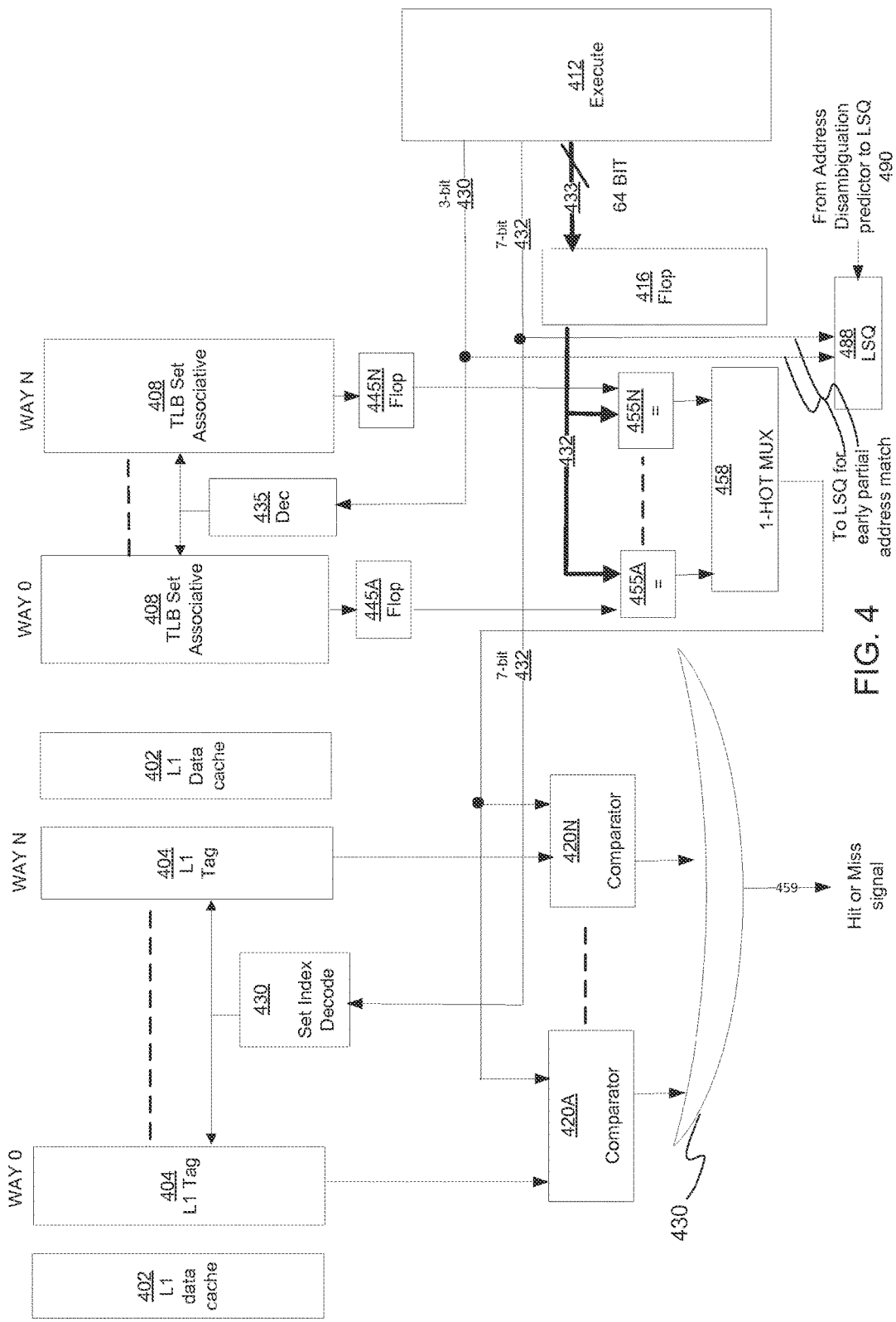
FIG. 4 is a high-level block diagram illustrating the critical components of an accelerated load-to-use path in an OOO processor in accordance with an embodiment of the present invention.

FIG. 4 is a high-level block diagram illustrating the critical components of an accelerated load-to-use path in an OOO processor in accordance with an embodiment of the present invention. FIG. 4 illustrates the manner in which the logical path illustrated in FIG. 2 can be realigned in order to make it faster and more efficient. More specifically, embodiments of the present invention allow earlier access time to the memory structures by making several adjustments to the load-to-use path as will be explained below.

Early Access of Lower Address Bits

In high performance designs, the time it takes to traverse the distance from the execution unit 212, where the address is calculated, to the furthest components in the memory subsystem, comprising TLB 208, cache Tag memory 204, and LSQ, can be significant. Further, when the calculated address bits comprise a large number of bits, e.g., 32 or 64 bits, the time required to perform all address additions can also be considerable.

In one embodiment, the present invention in effect borrows time from the clock cycle in which the address additions are performed to begin performing certain memory access operations using the earlier-available lower address bits, which results in time savings within the critical path. In one embodiment, the present invention borrows time from the clock cycle in which the address additions are performed by using the lower address bits, e.g., bits 430 and bits 432, which are computed earlier and faster than the higher order bits, to start accessing the TLB and L1-data cache in the same cycle that the address is generated by the address generation unit. The lower address bits from a 32-bit or 64-bit operation, for example, are generally available earlier and faster than the higher order bits. Conventional designs by comparison must wait for the entire address to be generated by the address generation unit 212 and stored into flop 216 before any memory access can be performed.

In one embodiment, a dedicated circuit (not shown) is configured within execution unit 412 to generate and route the earlier address bits, e.g., 3-bit 430 and 7-bit 432 from the address computation faster. In a different embodiment, instead of configuring a dedicated circuit to generate the earlier address bits, the early address bits are picked up and routed directly from the address generation unit as they are generated.

It should be noted that while the example illustrated in FIG. 4 uses a 64 bit address 432, the present invention is applicable to other architectures using addresses of different sizes. It should also be noted that while the example in FIG. 4 illustrates the 3-bit signal 430 and 7-bit signal 432 being generated early, the present invention is not so limited. In fact, any number of lower order bits can be generated depending on the number of sets in TLB 408 and L1-data cache 402. For example, in the example illustrated in FIG. 4, the TLB comprises 8 sets (2^3) and the L1-data cache comprises 128 sets (2^7). Typically, a TLB will be smaller than the L1-cache and, therefore, a fewer number of early access bits will be required to index into the TLB as compared to the L1-data cache.

As will be explained further below, the lower address bits 430 can be used for early access of a set-associative TLB 408, while the lower address bits 432 can be used to decode the correct L1-data cache 402 set.

Set Associative Translation Lookaside Buffer (TLB)

In one embodiment of the present invention, a set-associative TLB 408 is utilized as compared to the fully associative TLB of conventional designs. To start the TLB look-up early and thus lend time to the next cycle, the TLB is converted from a Fully Associative structure to a Set Associative structure. By using a set-associative TLB 408, the early accessed lower bits 430 can be used to decode the TLB 408 set using decoder 435 while the upper bits of the address are still being computed in execute module 412.

As compared to a conventional design wherein a fully computed address was needed to perform a look-up in a fully associative TLB 208, the design of the present invention increases efficiency by allowing the early-computed lower address bits to begin retrieving the ways of the set referenced by the lower address bits in the same cycle as the address computation. As mentioned above, for a fully associative structure to be addressed, the entire address is required, which is typically not available till late in the address generation cycle. Also performing a CAM match for a fully associative structure is a computationally expensive operation. By making the TLB 408 set associative, the limited address bits required to address the TLB set can be extracted from the execute module 412 early and be used to start decoding the appropriate TLB set. By breaking up the TLB look-up in parts, the present invention precludes the need to perform an expensive CAM operation across all the TLB entries and, further, reduces latencies by performing part of the lookup operation in the same cycle as the address generation.

It should be noted that flip-flops 445A through 445N are used to flop the respective ways of the set selected by lower address bits 430. This ensures that both the selected set from the TLB 408 and the full 64-bit address 433 generated and flopped at the output of flop 416 are available to comparators 445A through 445N at the same time for comparison. In other words, flops 445A to 445N ensure that at the end of the address computation cycle, both the full address 433 and the ways of the selected set from the TLB 408 are available to comparators 455A to 455N for comparison. By the time the decode of the TLB set is performed using bits 430, the full 64 bit address 433 is computed and available at the output of the respective flops for comparison by comparators 455A to 455N.

In other words, the early few bits that allow early memory subsystem access, e.g., bits 430 and 432 do not need to be flopped at the same time or same location, e.g., flop 416 as the full address bits. They can borrow time from the next cycle or travel much farther before they get flopped at the destinations, e.g., flops 445A to 445N, thus allowing a headroom in timing. This allows address partial matching within the TLB 408 and Tag memory 404 to start ahead of the full physical address arriving at the output of flop 416 to finalize the access.

The full virtual address 433 flopped at the output of flop 416 is used to compare against the multiple ways of the set selected by the address bits 430 to determine which of the ways, 0 to N, contains the physical address. In a TLB with 64 entries for example and 8 sets, the comparators would only need to perform 8 comparisons (or 8 CAM matches), one for each of the 8 ways of the TLB 408, to find a match as opposed to conventional designs where a CAM match would need to be performed for all 64 entries of a fully-associative cache. The correct physical address corresponding to the matching virtual address is then selected and forwarded to One-Hot multiplexer 458. It should be noted that multiplexer 458 can be One-Hot multiplexer because only one match signal will be generated from among comparators 455A to 455N. Therefore, no complex decoding is required in multiplexer 458. The single match signal generated will pull down the bypass gate directly allowing the corresponding physical address from the TLB to pass through.

In one embodiment, the same approach as the TLB can be used to index the L1-data cache 402 sets using the lower address bits 432. Accordingly, lower address bits 432 can start decoding the L1 Tag memory 404 set using decode module 430 earlier in time, e.g., in the cycle that the address computation is performed. The physical address routed to comparators 420A to 420N from One-Hot multiplexer 458 is used to perform the tag match once the set corresponding to address bits 432 has been decoded. Performing the tag match comprises comparing the physical address routed through multiplexer 458 to the tag bits of each way from L1 Tag memory 404 to find a match in the cache. The correct data from L1 D-cache 402 is then multiplexed out of the matched way from among the ways of the set selected by lower address bits 432. If a match is found in any of the ways, then the OR gate 430 signals a Load Hit 459, otherwise a Load Miss is signaled.

Utilizing Higher Metal Layers for Lower Address Bits

In one embodiment, the present invention utilizes a higher metal layer in the layout of the chip comprising the processor architecture to send the lower address bits, e.g., bits 430 and 432 that need to travel from the execution unit 412 to the memory subsystem, e.g., cache 402, TLB 408, LSQ 488 etc. Higher metal routes refer to the wider metal wires available during the layout process of a chip that owing to their width are lower resistance and thus faster. Traditionally, the large number of bits needed for the regular CAM search of the TLB prevents traditional designs from utilizing the higher metal layers as those high metal layers are a scarce resource and cannot accommodate the same number of bits as the lower and slower metal layers. By making the TLB set associative, the limited address bits required to address the TLB set can be extracted from the execution unit early and sped along the data path using higher metal routes.

In one embodiment, the acceleration of the cache lookup is also achieved by sending the low order bits faster utilizing a higher metal layer as described above.

Load Store Queue Modification

Carrying out load address disambiguation with the address of older stores in the Load Store Queue ("LSQ") may result in forwarding data from the youngest store older than the load. This is another long path in the load-to-use path, wherein all the dependencies that exist between the load instruction and stores older than the load in program order need to be disambiguated. This requires address matches across the Load Store Queue ("LSQ") to determine if data can be gathered in a satisfactory manner to supply the dependent instructions.

In one embodiment of the present invention, the load address disambiguation process can be modified to reduce or eliminate the time that is spent resolving dependencies in the queue. First, the higher metal layers can be used to carry the lower address bits of the load instruction, e.g., bits 430 and 432 available through the execution unit 412 to start the load-store data dependence calculation in the same cycle as the address computation. Instead of using the entire address to perform the disambiguation for determining a hit or miss in the LSQ, the lower bits can be used to create as unique a hash as possible. This hash can then be used to rule out some of the entries from within the LSQ 488. In other words, instead of waiting for the entire address to be available to search for stores older to the load instruction that may have stored to the same address as the load instruction, a partial search is performed using the lower address bits.

If no matches are found, then no dependencies exist and in that case no disambiguation needs to be performed. In one embodiment, if a partial match is found, then the processor may be configured to wait until the full address is available to perform a CAM search of the LSQ. In a different embodiment, however, the processor may be configured with a memory to store the subset of partial matches so that when the full address is available, a CAM search of only the partial matches is required. This embodiment is more efficient because it performs a partial match in an earlier cycle, which allows it to perform a rapid CAM match with fewer entries in a subsequent cycle when the full address is available.

Hit/Miss Generation Stage Optimization

Both the modification related to the TLB and LSQ discussed above provide efficiencies at the address generation stage of the pipeline. However, embodiments of the present invention also involve modifications that result in efficiencies at the hit/miss generation stage of the pipeline.

In the hit/miss generation stage of the pipeline, the physical address bits for the tag comparison are available early through Hot-Mux 458 owing to the early access bits that addressed the set associative TLB 408 in the prior address generation cycle. As discussed above, the VIPT cache 402 is accessed using the early few bits that traveled faster on higher metal layers. Accordingly, when the complete physical address is available from One-Hot multiplexer 458, it is compared to the tag bits of each way in the cache to match the physical address using comparators 420A to 420N.

In one embodiment of the present invention, a further optimization to the load-to-use path comprises the introduction of a hit/miss mechanism in the LSQ that is based on a prediction of whether the load will encounter a hazard with a store. In other words, a predictor can be deployed to predict whether the load instruction loads from the same address as a prior store in the LSQ. Using this prediction mechanism augmented with the early comparison of the lower address bits, as described above, reduces delays in the LSQ dramatically.

For example, instead of using the entire address to generate a full match and compare in the LSQ for a given load address, one embodiment of the present invention uses a load address disambiguation predictor (not shown in FIG. 4) that remembers previous instances of certain loads that had data forwarded to them from particular stores. In other words, the predictor records the history of prior instances of store to load forwarding in order to generate a prediction. This prediction is inputted into the LSQ through input 490. In conjunction with using the predictor input, one embodiment of the present invention also uses the few early lower address bits that are obtained earlier from the execution unit 412 because they traverse on higher metal layers in order to perform a partial CAM matching with the LSQ entries. If there is no partial match and there is no positive forwarding prediction from input 490, then the load is determined based completely on the fast cache lookup that results in either a Load Hit or Miss 459.

On the other hand, if the partial bit matching resulted in a positive match or if there was a positive forwarding prediction, then that matching entry's full address is read from the LSQ 488 and is matched with the full address generated by execute module 412. In this instance, a L1 miss will be signaled because an extra cycle will be required to evaluate whether the matching entry matches the address generated by execute module 412 and also to forward the correct data from the aliasing store in the LSQ 488 to the execution module for a consumer executing an instruction on the fly. In addition, the correct data can be written to a register file. Once the correct data is forwarded over from the LSQ, an L2 hit may potentially be signaled.

Figure 5:
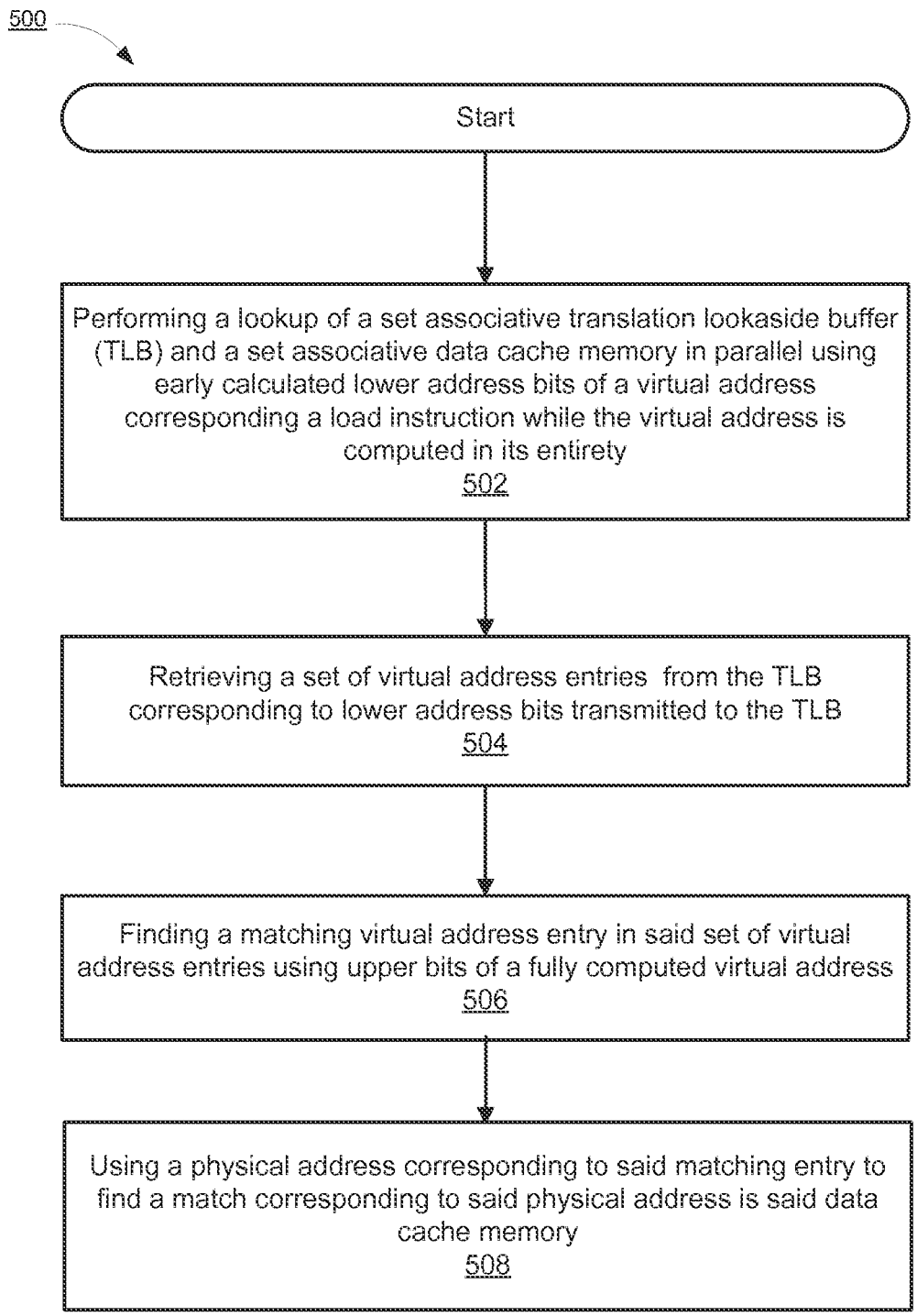
FIG. 5 depicts a flowchart 500 for an exemplary computer controlled process for processing a load instruction in an out-of-order micro-architecture in accordance with embodiments of the present invention.

FIG. 5 depicts a flowchart 500 for an exemplary computer controlled process for processing a load instruction in an out-of-order micro-architecture in accordance with embodiments of the present invention. While the various steps in this flowchart are presented and described sequentially, one of ordinary skill will appreciate that some or all of the steps can be executed in different orders and some or all of the steps can be executed in parallel. Further, in one or more embodiments of the invention, one or more of the steps described below can be omitted, repeated, and/or performed in a different order. Accordingly, the specific arrangement of steps shown in FIG. 5 should not be construed as limiting the scope of the invention. Rather, it will be apparent to persons skilled in the relevant art(s) from the teachings provided herein that other functional flows are within the scope and spirit of the present invention. Flowchart 500 may be described with continued reference to exemplary embodiments described above, though the method is not limited to those embodiments.

At step 502, a lookup is performed of a set associative TLB 408 and a set associative data cache tag memory 404 in parallel using early calculated lower address bits of a virtual address, e.g., 430 and 432, corresponding a load instruction while the virtual address is computed in its entirety in the same cycle.

At step 504, a set of virtual address entries from the TLB is retrieved corresponding to the set of lower address bits, e.g., 430 transmitted to the TLB to perform the set lookup.

At step 506, a matching entry is found in the set of virtual address entries retrieved from the TLB using the upper bits of the fully computed virtual address.

Finally at step 508, the physical address corresponding to the matching virtual address entry is used to find a match corresponding to the physical address in the data cache tag memory.

Figure 6:
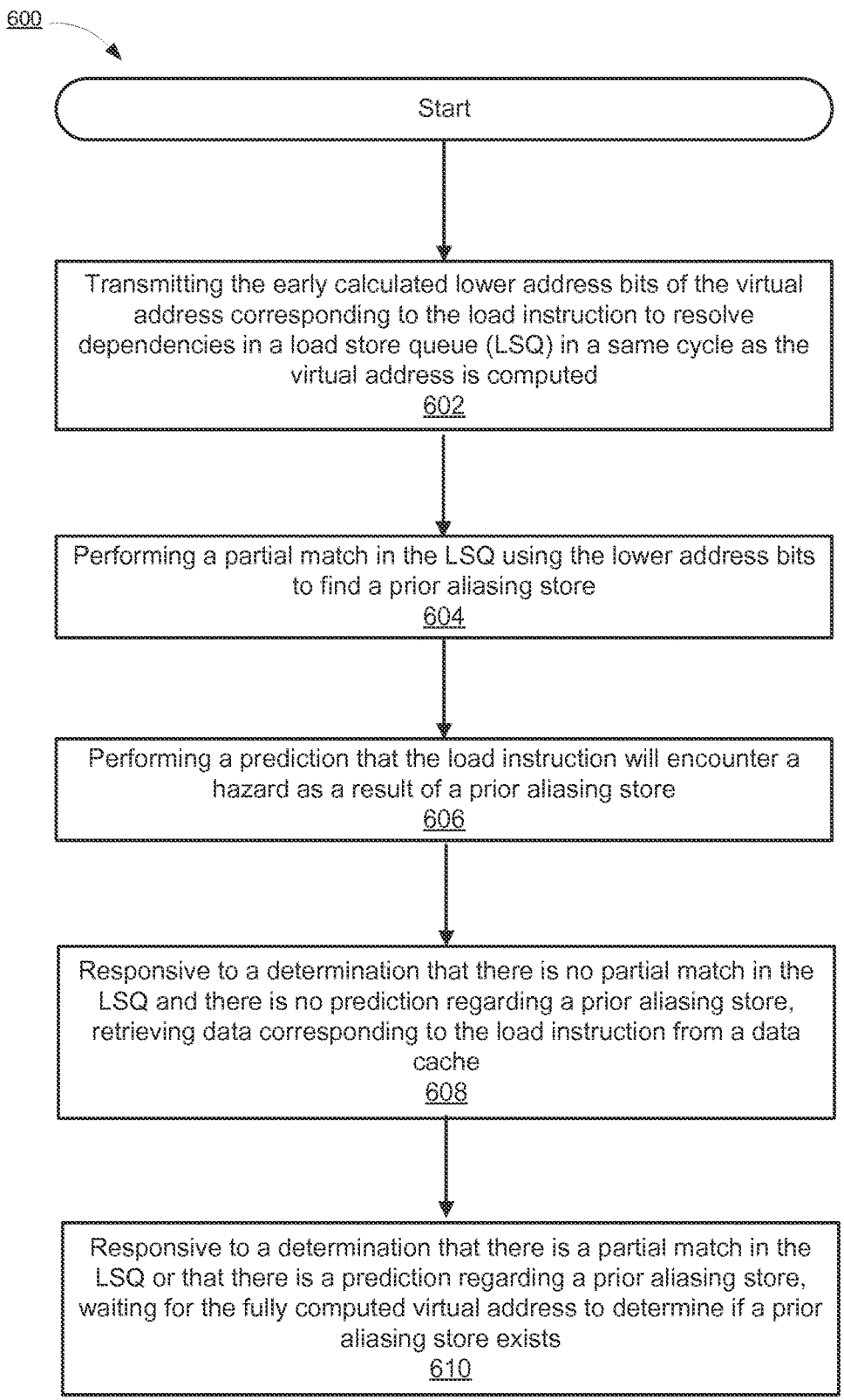
FIG. 6 depicts a flowchart 600 for an exemplary computer controlled process for resolving dependencies in a load store queue using early calculated lower address bits in an out-of-order micro-architecture in accordance with embodiments of the present invention.

FIG. 6 depicts a flowchart 600 for an exemplary computer controlled process for resolving dependencies in a load store queue using early calculated lower address bits in an out-of-order micro-architecture in accordance with embodiments of the present invention. While the various steps in this flowchart are presented and described sequentially, one of ordinary skill will appreciate that some or all of the steps can be executed in different orders and some or all of the steps can be executed in parallel. Further, in one or more embodiments of the invention, one or more of the steps described below can be omitted, repeated, and/or performed in a different order. Accordingly, the specific arrangement of steps shown in FIG. 6 should not be construed as limiting the scope of the invention. Rather, it will be apparent to persons skilled in the relevant art(s) from the teachings provided herein that other functional flows are within the scope and spirit of the present invention. Flowchart 600 may be described with continued reference to exemplary embodiments described above, though the method is not limited to those embodiments.

At step 602, the early calculated lower address bits of the virtual address corresponding to the load instruction are transmitted to the LSQ to resolve dependencies in the LSQ in the same cycle as the one in which the virtual address is computed.

At step 604, a partial match in the LSQ is performed using the lower address bits to find any entries that could be a prior aliasing store for the load instruction.

At step 606, a prediction is performed that the load instruction has a prior aliasing store in the LSQ, wherein the prediction is performed based on prior instances of store to load forwarding for that particular load instruction.

At step 608, responsive to a determination that there is no partial match in the LSQ and there is no prediction regarding a prior aliasing store, data corresponding to the physical address of the load instruction is retrieved from the data cache memory in the event of a Load Hit.

At step 610, responsive to a determination that there is a partial match in the LSQ or that there is a prediction regarding a prior aliasing store, then the entry corresponding to the partial match or prediction needs to be compared with the fully computed virtual address to determine if there is a match.

Figure 7:
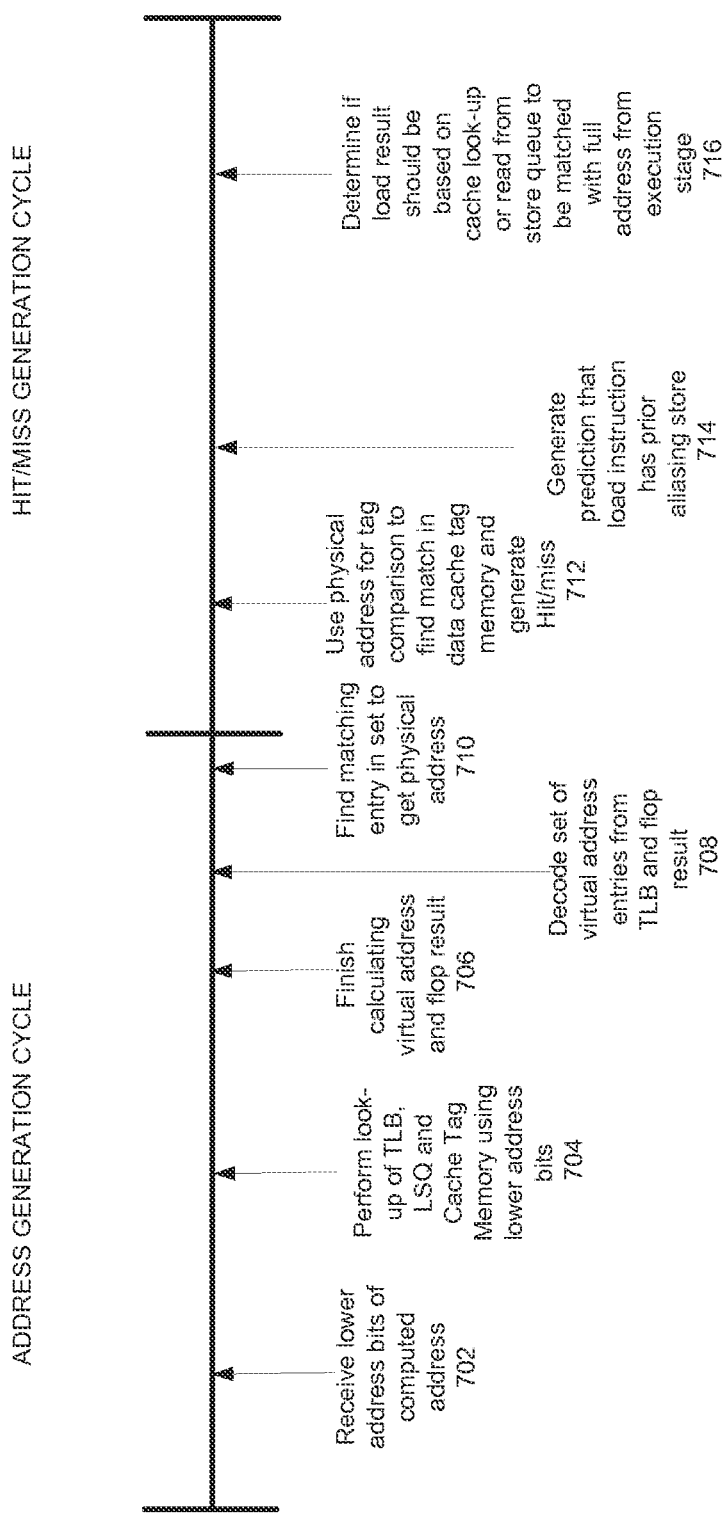
FIG. 7 depicts a timing diagram illustrating an exemplary sequence in which operations are performed in an accelerated load-to-use path in accordance with one embodiment of the present invention.

FIG. 7 depicts a timing diagram illustrating an exemplary sequence in which operations are performed in an accelerated load-to-use path in accordance with one embodiment of the present invention. It should be noted that the timing diagram illustrated in FIG. 7 is merely exemplary and that operations could be performed in a sequence other than the one demonstrated in FIG. 7.

As discussed above, at step 702 of the address generation cycle, lower address bits of the virtual address bits are first available. These lower address bits are used to perform a look-up of the TLB 408, LSQ 488 and cache tag memory 404 at step 704. At step 706, the virtual address is fully computed and available at the output of flop 416. At step 708, the decoded set of virtual address entries from TLB 408 is available and the result is flopped out through flops 445A to 445N. At step 710, comparators 455A to 455N are used to find a matching entry in the decoded set using the computed virtual address to retrieve a physical address, wherein the physical address is used to match the tags decoded from tag memory 404.

In the Hit/Miss generation cycle, at step 712, the physical address is used to perform a tag comparison in order to find a match in the data cache tag memory 404 and generate a Hit or Miss signal depending on the result of the matching operation. At step 714, a prediction is generated regarding if the load instruction has a prior aliasing store that may result in a hazard. At step 716, depending on the result of the prediction and the result of the earlier lookup in the LSQ, a determination is made regarding if the load result should be based on a cache lookup or read from the store queue, wherein if the load result is read from the store queue, then it needs to be matched with the full address when it is available as discussed above.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A microprocessor implemented method for resolving dependencies for a load instruction in a load store queue (LSQ), said method comprising:
   initiating a computation of a virtual address corresponding to said load instruction in a first clock cycle;
   transmitting early calculated lower address bits of said virtual address to a load store queue (LSQ) in said first clock cycle, wherein said early calculated lower address bits are computed earlier and faster than upper bits of said virtual address to allow for earlier access times in a pipeline of said microprocessor;
   performing a partial match in said LSQ responsive to and using said lower address bits to find a prior aliasing store, wherein said prior aliasing store stores to a same address as said load instruction; and
   responsive to a determination that there is a partial match in said LSQ, storing a set of partially matched entries from said LSQ in a memory and performing a look-up on said set of partially matched entries in a second clock cycle.

2. The method of claim 1 further comprising:
   performing a prediction that said load instruction has a prior aliasing store in said LSQ; and
   responsive to a determination that there is no partial match in said LSQ and no prediction is available, retrieving data corresponding to said load instruction from a data cache memory in said second clock cycle.

3. The method of claim 2, wherein said prediction is based on prior instances of store-to-load forwarding for said load instruction.

4. The method of claim 2, further comprising:
responsive to said determination that there is a partial match in said LSQ, waiting for said virtual address to fully compute to perform said look-up on said set of partially matched entries in said second clock cycle.

5. The method of claim 1, further comprising:
routing said lower address bits to said LSQ using a higher metal route relative to other bits of said virtual address.

6. The method of claim 1, wherein said performing and said initiating are performed in a same cycle.

7. A processor unit configured to perform operations for resolving dependencies for a load instruction in a load store queue (LSQ), said operations comprising:
initiating a computation of a virtual address corresponding to said load instruction in a first clock cycle;
transmitting early calculated lower address bits of said virtual address to a load store queue (LSQ) in said first clock cycle, wherein said early calculated lower address bits are computed earlier and faster than upper bits of said virtual address to allow for earlier access times in a pipeline of said processor;
performing a partial match in said LSQ responsive to and using said lower address bits to find a prior aliasing store, wherein said prior aliasing store stores to a same address as said load instruction; and
responsive to a determination that there is a partial match in said LSQ, storing a set of partially matched entries from said LSQ in a memory and performing a look-up on said set of partially matched entries in a second clock cycle.

8. The processor unit of claim 7, wherein said operations further comprise:
performing a prediction that said load instruction has a prior aliasing store in said LSQ; and
responsive to a determination that there is no partial match in said LSQ and no prediction is available, retrieving data corresponding to said load instruction from a data cache memory in said second clock cycle.

9. The processor unit of claim 8, wherein said prediction is based on prior instances of store-to-load forwarding for said load instruction.

10. The processor unit of claim 8, wherein said operations further comprise:
responsive to said determination that there is a partial match in said LSQ, waiting for said virtual address to fully compute to perform said look-up on said set of partially matched entries in said second clock cycle.

11. The processor unit of claim 7, wherein said operations further comprise:
routing said lower address bits to said LSQ using a higher metal route relative to other bits of said virtual address.

12. The processor unit of claim 7, wherein said performing and said initiating are performed in a same cycle.

13. An apparatus configured to resolve dependencies for a load instruction in a load store queue (LSQ), said apparatus comprising:
a memory;
a processor communicatively coupled to said memory, wherein said processor is configured to process instructions out of order, and further wherein said processor is configured to perform operations comprising:
initiating a computation of a virtual address corresponding to said load instruction in a first clock cycle;
transmitting early calculated lower address bits of said virtual address to a load store queue (LSQ) in said first clock cycle, wherein said early calculated lower address bits are computed earlier and faster than upper bits of said virtual address to allow for earlier access times in a pipeline of said processor;
performing a partial match in said LSQ responsive to and using said lower address bits to find a prior aliasing store, wherein said prior aliasing store stores to a same address as said load instruction; and
responsive to a determination that there is a partial match in said LSQ, storing a set of partially matched entries from said LSQ in a storage and performing a look-up on said set of partially matched entries in a second clock cycle.

14. The apparatus of claim 13, wherein said operations further comprise:
performing a prediction that said load instruction has a prior aliasing store in said LSQ; and
responsive to a determination that there is no partial match in said LSQ and no prediction is available, retrieving data corresponding to said load instruction from a data cache memory in said second clock cycle.

15. The apparatus of claim 14, wherein said prediction is based on prior instances of store-to-load forwarding for said load instruction.

16. The apparatus of claim 14, wherein said operations further comprise:
responsive to said determination that there is a partial match in said LSQ, waiting for said virtual address to fully compute to perform said look-up on said set of partially matched entries in said second clock cycle.

17. The apparatus of claim 13, wherein said operations further comprise:
routing said lower address bits to said LSQ using a higher metal route relative to other bits of said virtual address.

18. The apparatus of claim 13, wherein said performing and said initiating are performed in a same cycle.

* * * * *